UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

RED HALOGEN VAT-DYE AND PROCESS OF MAKING SAME.

No. 887,609.  Specification of Letters Patent.  Patented May 12, 1908.

Application filed October 1, 1907. Serial No. 395,424.

*To all whom it may concern:*

Be it known that I, GADIENT ENGI, doctor of philosophy and chemist, a citizen of the Swiss Republic, and resident of Basel, Switzerland, have invented new and useful Red Halogenated Vat-Dyes and a Process of Making the Same, of which the following is a full, clear, and exact specification.

In United States Patent No. 841003 dated January 8th 1907 is described a red vat-dye resulting from the condensation of salicylthioacetic acid with isatin and corresponding probably to the formula

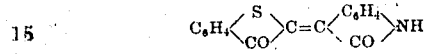

Since I have found, that exceedingly valuable halogen derivatives of this dye can be obtained by condensing 3-oxy-1-thionaphthene

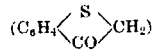

with halogen derivatives of an isatin compound. These dyes show relatively to the not halogenated dye the advantage of a greater affinity to vegetable fibers and are consequently distinguished by an excellent fastness to washing. The fastness to light is also increased.

The preparation of the said new dyes is illustrated by the following examples.

Example I. 5 parts of monobromisatin (prepared by brominating isatin in glacial acetic acid), 3.5 parts of 3-oxy-1-thionaphthene and 50 parts of nitrobenzene are boiled together for two hours in a reflux apparatus; after cooling the separated dyestuff is isolated by filtration, washed with alcohol and dried. It is obtained in the form of small yellow-red crystals, soluble in concentrated sulfuric acid to a dirty brown solution from which an addition of water precipitates the unchanged dyestuff as scarlet-red flocks. Fuming sulfuric acid of 24% $SO_3$ dissolves the dyestuff with a brown red coloration turning quickly to blue-red; by pouring this solution in ice water a blue-red solution results. In hot benzene only traces of the dyestuff dissolve with a clear rose coloration; it dissolves hardly in cold nitrobenzene, but rather easily in hot nitrobenzene with a deep red coloration. By its treatment with the usual reducing agents the dyestuff yields a bright yellow vat dyeing unmordanted cotton red tints.

Example II. A mixture of 10 parts of dibromisatin of melting point 248° C. (obtained by boiling in a reflux apparatus 5 parts of isatin with 25 parts of glacial acetic acid and 11 parts of bromin), 5 parts of 3-oxy-1-thionaphthene and 80 parts of nitrobenzene, is heated in the oil bath in a reflux apparatus, for about 2 hours, the temperature of the oil bath being 226-227° C. After cooling the mixture is filtered and the solid matter is washed with alcohol and dried. The condensation product is thus obtained in nearly quantitative yield as small lustrous, brown-red crystals. Its solubility in benzene and nitrobenzene and the coloration of its sulfuric solutions are analogous to those of the monobromo derivative manufactured accordingly to the Example I. It dyes cotton in an alkaline vat clear red tints of very excellent fastness to washing, light and chlorin. The condensation may be effected in the presence of various solvents or condensing agents, instead of in nitrobenzene; for instance in water or in alcohol. Instead of using previously prepared 3 oxy-1-thionaphthene, salicylthioacetic acid may be used as the parent material together with an indifferent condensing agent which is capable of forming 3-oxy-1-thionaphthene from salicylthioacetic acid under the conditions obtaining during the reaction, for instance acetic anhydrid.

Example III. 10 parts of salicylthioacetic acid, 14.5 parts of dibromisatin and 60 parts of acetic anhydrid are heated together to boiling, in a reflux apparatus; after a short time the condensation product separates as small well-formed red crystals. After about 2 hours boiling the mixture is cooled, filtered, and the solid matter washed with alcohol and dried; in this manner the product is obtained in very good yield and of satisfactory purity. With like result other halogen derivatives of isatin and its homologues may be substituted for the monobromisatin or the dibromisatin in the foregoing examples; as for instance monochlorisatin, monobrom-ortho-methylisatin, dichlorisatin of melting point 205-208° C. (made by chlorinating isatin in glacial acetic acid) chlorobromisatin of melting point 233-234° C., (obtained by chlorinating bromisatin in glacial acetic acid), bromochlorisatin of melting point 243-246° C. (obtained by brominating chlorisatin in glacial acetic acid).

What I claim is:

1. The process for the manufacture of halogenated red vat-dyestuffs by condensing one molecule of 3-oxy-1-thionaphthene with one molecule of a halogenated isatin compound, as described.

2. The process for the manufacture of halogenated red vat dyestuffs by boiling one molecule of salicylthioacetic acid with one molecule of a halogenated isatin compound in presence of a condensing agent capable of transforming the salicylthioacetic acid intermediary into 3-oxy-1-thionaphthene, as described.

3. As new products the halogenated red vat dyestuffs which can be obtained by condensing one molecule of 3-oxy-1-thionaphthene with one molecule of a halogenated isatin compound, and which are insoluble in cold benzene and nitrobenzene, only sparingly soluble in hot benzene with a clear rose coloration, rather easily soluble in hot nitrobenzene with a deep red color, dissolve in concentrated sulfuric acid with a dirty brown coloration, and yields on treatment with alkaline reducing agents bright yellow vats, from which vats unmordanted cotton is dyed in red shades, fast to washing, light and chlorin.

In witness whereof I have hereunto signed my name this 20th day of September 1907, in the presence of two subscribing witnesses.

GADIENT ENGI.

Witnesses:
 GEO. GIFFORD,
 AMAND RITTER.